United States Patent [19]

Smith et al.

[11] Patent Number: 5,242,957
[45] Date of Patent: Sep. 7, 1993

[54] ALKALINE RESOL PHENOL-ALDEHYDE RESIN BINDER COMPOSITIONS CONTAINING PHENYL ETHYLENE GLYCOL ETHER

[75] Inventors: Garry Smith, Sutton Coldfield; Martin Bradley, Solihull, both of England

[73] Assignee: Foseco International Limited, Birmingham, England

[21] Appl. No.: 834,863

[22] Filed: Feb. 13, 1992

[30] Foreign Application Priority Data

Mar. 13, 1991 [GB] United Kingdom ............... 9105315

[51] Int. Cl.$^5$ ............................................... B22C 1/22
[52] U.S. Cl. ................................... 523/145; 523/139; 524/443; 524/594; 524/596; 525/506; 528/138; 528/139; 528/142
[58] Field of Search ............... 524/443, 142, 594, 596, 524/700, 713; 525/506; 528/138, 139, 142; 523/147, 139, 145

[56] References Cited

U.S. PATENT DOCUMENTS

| | | | |
|---|---|---|---|
| 4,311,631 | 1/1982 | Meyers et al. | 524/871 |
| 4,929,648 | 5/1990 | Armbruster et al. | 524/147 |
| 4,939,188 | 7/1990 | Gerber | 525/508 |
| 4,971,132 | 11/1990 | Armbruster | 164/16 |
| 4,977,209 | 12/1990 | Barker et al. | 528/138 |
| 4,985,489 | 1/1991 | Barker et al. | 528/138 |
| 5,032,642 | 7/1991 | Lemon et al. | 525/508 |

FOREIGN PATENT DOCUMENTS 4-147743  5/1992  Japan.

OTHER PUBLICATIONS

Rose, Arthur & Elizabeth, The Condensed Chemical Dictionary, 7th Ed., Van Nostrand Reinhold Co., pp. 190 & 394, 1969.

Primary Examiner—Morton Foelak
Assistant Examiner—Richard Lee Jones
Attorney, Agent, or Firm—Nixon & Vanderhye

[57] ABSTRACT

A binder composition for producing articles of bonded particulate material such as foundry molds or cores comprises an alkaline aqueous solution of a resol phenol-aldehyde resin, an oxyanion which can form a stable complex with the resin, and a phenyl ethylene glycol ether. The binder composition has an alkali to phenol molar ratio of from 1.5:1 to 2.5:1 and the amount of alkali present in the solution is sufficient to substantially prevent stable complex formation between the resin and the oxyanion. Bonded articles are produced by passing carbon dioxide gas through articles formed from a mixture of particulate material and the binder composition so as to produce stable complex formation and curing of the resin.

9 Claims, No Drawings

ALKALINE RESOL PHENOL-ALDEHYDE RESIN BINDER COMPOSITIONS CONTAINING PHENYL ETHYLENE GLYCOL ETHER

This invention relates to alkaline resol phenol-aldehyde binder compositions and their use in the production of articles of bonded particulate material such as foundry molds or cores.

U.S. Pat. Nos. 4,985,489 and 4,977,209 describes a binder composition comprising an alkaline aqueous solution of a resol phenol-aldehyde resin and an oxyanion which can form a stable complex formation between the resin and the oxyanion. U.S. Pat. Nos. 4,985,489 and 4,977,209 also describes a process for the production of an article of bonded particulate material, such as a foundry mold or core, in which a mixture of particulate material and the binder composition is formed to a desired shape, and carbon dioxide gas is then passed through the formed shape so as to cause the oxyanion to form a stable complex with the resin and thereby to cure the resin.

It has now been found that the performance of the binder composition can be improved if the binder composition also contains a phenyl ethylene glycol ether.

According to the present invention there is provided a binder composition comprising an alkaline aqueous solution of a resol phenol-aldehyde resin and an oxyanion which can form a stable complex with the resin, the amount of alkali present in the solution being sufficient to substantially prevent stable complex formation between the resin and the oxyanion, wherein the molar ratio of alkali to phenol is from 1.5:1 to 2.5:1 and the binder composition also contains a phenyl ethylene glycol ether.

According to a further feature of the invention there is provided a process for the production of an article of bonded particulate material comprising forming to the desired shape a mixture of particulate material and a binder composition comprising an alkaline aqueous solution of a resol phenol-aldehyde resin having an alkali to phenol molar ratio of from 1.5:1 to 2.5:1, an oxyanion which can form a stable complex with the resin, and a phenyl ethylene glycol ether, and passing carbon dioxide gas through the formed shape so as to cause the oxyanion to form a stable complex with the resin, and thereby to cure the resin.

The binder composition and the process of the invention are of particular value for making foundry molds and cores and it is with reference to that application that the invention will be described.

Suitable phenol-aldehyde resins and oxyanions for use in the binder compositions of the invention, and suitable methods for producing the phenol-aldehyde resin are described in EP 0323096A the disclosure of which is incorporated herein by reference.

The phenyl ethylene glycol ether may be for example, phenyl monoethylene glycol ether which may be used as the pure compound or as a commercially available material which also contains phenol diethylene glycol ether as an impurity.

The optimum amount of phenyl ethylene glycol ether contained in the binder composition will vary depending on the composition of the resin, but will usually be within the range of 1%–10% by weight, preferably 2-5%, based on the weight of the binder composition.

The presence of the phenyl ethylene glycol ether may have one or more beneficial effects on the performance of the binder composition as a binder for making foundry molds and cores, depending on the composition of the particular resin.

The beneficial effects include:

(i) improved mold or core strength immediately after gassing with carbon dioxide gas.

(ii) improved strength after gassed molds or cores have been stored before use, for example for up to 24 hours or longer.

(iii) improved strength of molds or cores which have been coated with an alcohol based coating which has been dried by burning off the alcohol, prior to storage of the molds or cores.

(iv) improved mixed sand flowability.

(v) improved mold or core surface finish and edge hardness.

The binder composition of the invention preferably also contains a silane such as gammaaminopropyltriethoxysilane, N-(2-aminoethyl)-3-aminopropyltrimethoxysilane, phenol trimethoxysilane or gamma-glycidoxypropyltrimethoxysilane usually in an amount of 0.2% to 1.0% by weight based on the weight of the binder composition.

The following Examples will serve to illustrate the invention:

EXAMPLE 1

A resol phenol-formaldehyde resin was synthesised having the following composition:

| | |
|---|---|
| phenol | 800.00 g |
| 91% W/W paraformaldehyde | 642.20 g |
| 50% W/W sodium hydroxide solution | 40.85 g |
| F:P molar ratio | 2.3:1 |
| OH:P molar ratio | 0.06:1 |
| Water in starting composition | 5.2% W/W |

The following procedure was used:
1. Charge and melt phenol
2. Charge paraformaldehyde and part of the sodium hydroxide solution and heat to 60°–65° C. at a rate of 1° C. per minute
3. Cool to counteract exothermic reaction and maintain at 60°–65° C. while adding the remainder of the sodium hydroxide solution over a period of 1 hour
4. Heat to 75° C. at a rate of 1° C. per minute
5. Maintain at 75° C. for 30 minutes
6. Heat to 85° C. at a rate of 1° C. per minute
7. Maintain at 85° C. for sufficient time for the resin to reach a viscosity of 4000–6000 cp at 25° C. as measured on a 25 g sample diluted with 15 g of 50% w/w potassium hydroxide solution using Paint Research Association Bubble Viscosity Tubes.

The resin was used to produce a base binder (1) having the following composition by weight:

| | |
|---|---|
| resin | 25 parts |
| 50% W/W potassium hydroxide solution | 35 parts |
| borax | 5.5 parts |
| gamma aminopropyltriethoxysilane | 0.39 parts |

The potassium hydroxide solution was added to the resin, the temperature rise due to exothermic reaction was controlled and the resin was cooled. The borax was added and mixed into the resin until it had dissolved. The silane was then added at a temperature of below 30°

C. The molar ratio of alkali to phenol in the base binder was approximately 2:1.

Binder composition 2 was prepared from some of the base binder 1 by dissolving 2% by weight of pure phenyl monoethylene glycol ether in 98% by weight of base binder 1.

Both binders were tested as binders for foundry sand using the following procedure:

3% by weight of the binder based on the weight of sand was mixed with Chelford 60 sand (AFS Fineness No. 62) and the mixture was used to prepare standard AFS 50 mm×50 mm diameter cylindrical cores. The sand temperature was 18° C. The cores were hardened by the passage of carbon dioxide gas for various times at 0.35 kg/cm$^2$ line pressure and a 6.0 liters per minute flow rate.

Some of the cores were tested immediately after gassing on a George Fischer Universal Strength Machine Type PFA fitted with a High-Dry Compressive Strength Attachment Type PHD. Some were tested after storage for 3 days in dry storage conditions (temperature 17°-20° C., relative humidity 30-35%) and others were tested after storage for 3 days in humid storage conditions (temperature 26°-28° C., relative humidity 85-90%).

The results obtained are tabulated in Table 1 below.

TABLE 1

| BINDER | | COMPRESSION STRENGTH (kg/cm$^2$) | |
|---|---|---|---|
| | | 1 | 2 |
| AS GASSED | | | |
| GASSING TIME | 30S | 12.9 | 19.5 |
| | 60S | 15.5 | 22.1 |
| | 120S | 18.3 | 24.3 |
| DRY STORAGE | | | |
| GASSING TIME | 30S | 17.0 | 26.4 |
| | 60S | 16.4 | 23.0 |
| | 120S | 16.5 | 27.5 |
| HUMID STORAGE | | | |
| GASSING TIME | 30S | 13.4 | 22.1 |
| | 60S | 14.0 | 22.7 |
| | 120S | 14.1 | 22.1 |

EXAMPLE 2

Using some of the basic binder 1 of Example 1 a binder composition 3 was prepared by dissolving 5% by weight of pure phenyl monoethylene glycol ether in 95% by weight of base binder 1.

Binders 1 and 3 were tested as described in example 1 except that for the storage tests the test cores were stored for 24 hours instead of 3 days.

The results obtained are tabulated in Table 2 below.

TABLE 2

| BINDER | | COMPRESSION STRENGTH (kg/cm$^2$) | |
|---|---|---|---|
| | | 1 | 3 |
| AS GASSED | | | |
| GASSING TIME | 30S | 12.9 | 19.3 |
| | 60S | 17.2 | 22.3 |
| | 120S | 18.2 | 24.9 |
| DRY STORAGE | | | |
| GASSING TIME | 30S | 18.0 | 29.0 |
| | 60S | 20.5 | 31.0 |
| | 120S | 20.7 | 29.6 |
| HUMID STORAGE | | | |
| GASSING TIME | 30S | 14.0 | 25.1 |
| | 60S | 15.6 | 24.2 |
| | 120S | 15.6 | 24.4 |

EXAMPLE 3

A series of binders 4-7 were prepared from base binder 1 containing respectively 2%, 4%, 7.5% and 10% by weight of pure phenyl monoethylene glycol ether (PMEGE) based on the weight of the binder.

The binders were tested using the same procedure as described in Example 1. The sand temperature was 18°-18.5° C., the dry storage conditions were 17°-19° C., and 40-45% relative humidity and the humid storage conditions were 25°-27° C. and 80-90% relative humidity.

The results obtained are tabulated in Tables 3, 4, and 5 below.

TABLE 3

| BINDER | PMEGE (WT %) | COMPRESSION STRENGTH (kg/cm$^2$) AS GASSED FOR GASSING TIME | | |
|---|---|---|---|---|
| | | 30S | 60S | 120S |
| 4 | 2 | 15.5 | 18.8 | 19.8 |
| 5 | 4 | 16.0 | 19.3 | 20.7 |
| 6 | 7.5 | 14.4 | 17.8 | 19.7 |
| 7 | 10 | 13.5 | 16.1 | 19.0 |

TABLE 4

| BINDER | PMEGE (WT %) | COMPRESSION STRENGTH (kg/cm$^2$) AFTER DRY STORAGE FOR GASSING TIME | | |
|---|---|---|---|---|
| | | 30S | 60S | 120S |
| 4 | 2 | 27.6 | 29.0 | 29.0 |
| 5 | 4 | 33.0 | 35.0 | 35.5 |
| 6 | 7.5 | 33.5 | 39.0 | 35.0 |
| 7 | 10 | 33.5 | 36.0 | 36.5 |

TABLE 5

| BINDER | PMEGE (WT %) | COMPRESSION STRENGTH (kg/cm$^2$) AFTER HUMID STORAGE FOR GASSING TIME | | |
|---|---|---|---|---|
| | | 30S | 60S | 120S |
| 4 | 2 | 20.6 | 19.6 | 21.4 |
| 5 | 4 | 22.9 | 23.0 | 23.9 |
| 6 | 7.5 | 35.6 | 29.2 | 28.6 |
| 7 | 10 | 27.0 | 29.5 | 28.9 |

The results in the Examples demonstrate the benefit of adding phenyl monoethylene glycol ether to the base resin in terms of core strength. As gassed strength of the cores tends to peak at about 4% by weight addition while storage strengths continue to show improvements at higher levels of addition.

We claim:

1. A binder composition for forming foundry molds or cores comprising an alkaline aqueous solution of a resol phenol-aldehyde resin and an oxyanion which can form a stable complex with the resin, the amount of alkali present in the solution being sufficient to solubilise the resin and to substantially prevent stable complex formation between the resin and the oxyanion, wherein the molar ratio of alkali to phenol is from 1.5:1 to 2.5:1 and the binder composition also contains a phenyl ethylene glycol ether in an amount sufficient to improve foundry mold or core strength immediately after gassing with carbon dioxide and after storage.

2. A binder composition according to claim 1 wherein the phenyl ethylene glycol ether is phenyl monoethylene glycol ether or a mixture of phenyl monoethylene glycol ether and phenol diethylene glycol ether.

3. A binder composition according to claim 1 wherein the phenyl ethylene glycol ether is present in an amount of 1% to 10% by weight based on the weight of the binder composition.

4. A binder composition according to claim 3 wherein the phenyl ethylene glycol ether is present in an amount of 2% to 5% by weight based on the weight of the binder composition.

5. A binder composition according to claim 1 wherein the composition contains in addition a silane.

6. A binder composition according to claim 5 wherein the silane is gammaaminopropyltriethoxysilane, N-(2-aminoethyl)-3-aminopropyltrimethoxysilane, phenol trimethoxysilane or gammaglycidoxypropyltrimethoxysilane.

7. A binder composition according to claim 5 wherein the amount of silane present is from 0.25% to 1.0% by weight based on the weight of the binder composition.

8. A process for the production of a mold or core of bonded particulate material, comprising the steps of:
 (i) forming a mixture of a binder and particulate material to a desired shape, the binder comprising: an alkaline aqueous solution of a resol phenol-aldehyde resin having an alkali to phenol molar ration of 1.5:1 to 2.5:1; an oxyanion which can form a stable complex with the resin; and a phenyl ethylene glycol ether; the amount of alkali present in the solution being sufficient to solubilise the resin and to substantially prevent stable complex formation between the resin and the oxyanion and the amount of phenyl ethylene glycol ether being sufficient to improve foundry mold or core strength immediately after gassing with carbon dioxide and after storage
 (ii) passing carbon dioxide gas through the formed shape so as to cause the oxyanion to form a stable complex with the resin; and
 (iii) curing the resin to form an article of bonded particulate material.

9. A process according to claim 1 wherein the oxyanion is borate.

* * * * *